United States Patent [19]
Diferdinando

[11] 3,884,120
[45] May 20, 1975

[54] MILLING MACHINE CUTTER ADAPTOR
[75] Inventor: Frank L. Diferdinando, Malvern, Pa.
[73] Assignee: Gorham Tool Company, Detroit, Mich.
[22] Filed: Nov. 12, 1973
[21] Appl. No.: 414,868

[52] U.S. Cl.............. 90/11 A; 279/1 A; 279/1 TS; 279/83; 279/103; 408/239
[51] Int. Cl............................................ B23b 31/02
[58] Field of Search........... 90/11 A; 279/1 TS, 103, 279/83, 1 A; 408/238, 239, 239 A

[56] References Cited
UNITED STATES PATENTS
3,202,433  8/1965  Davis............................ 408/238 X FOREIGN PATENTS OR APPLICATIONS
865,597  4/1961  United Kingdom................. 90/11 A
927,223  5/1963  United Kingdom................. 90/11 A Primary Examiner—J. M. Meister
Assistant Examiner—Z. R. Bilinsky
Attorney, Agent, or Firm—Barnes, Kisselle, Raisch & Choate

[57] ABSTRACT

An adaptor with a single body for selectively mounting either an end mill cutter or a face mill cutter on a drive spindle of a milling machine.

1 Claim, 5 Drawing Figures

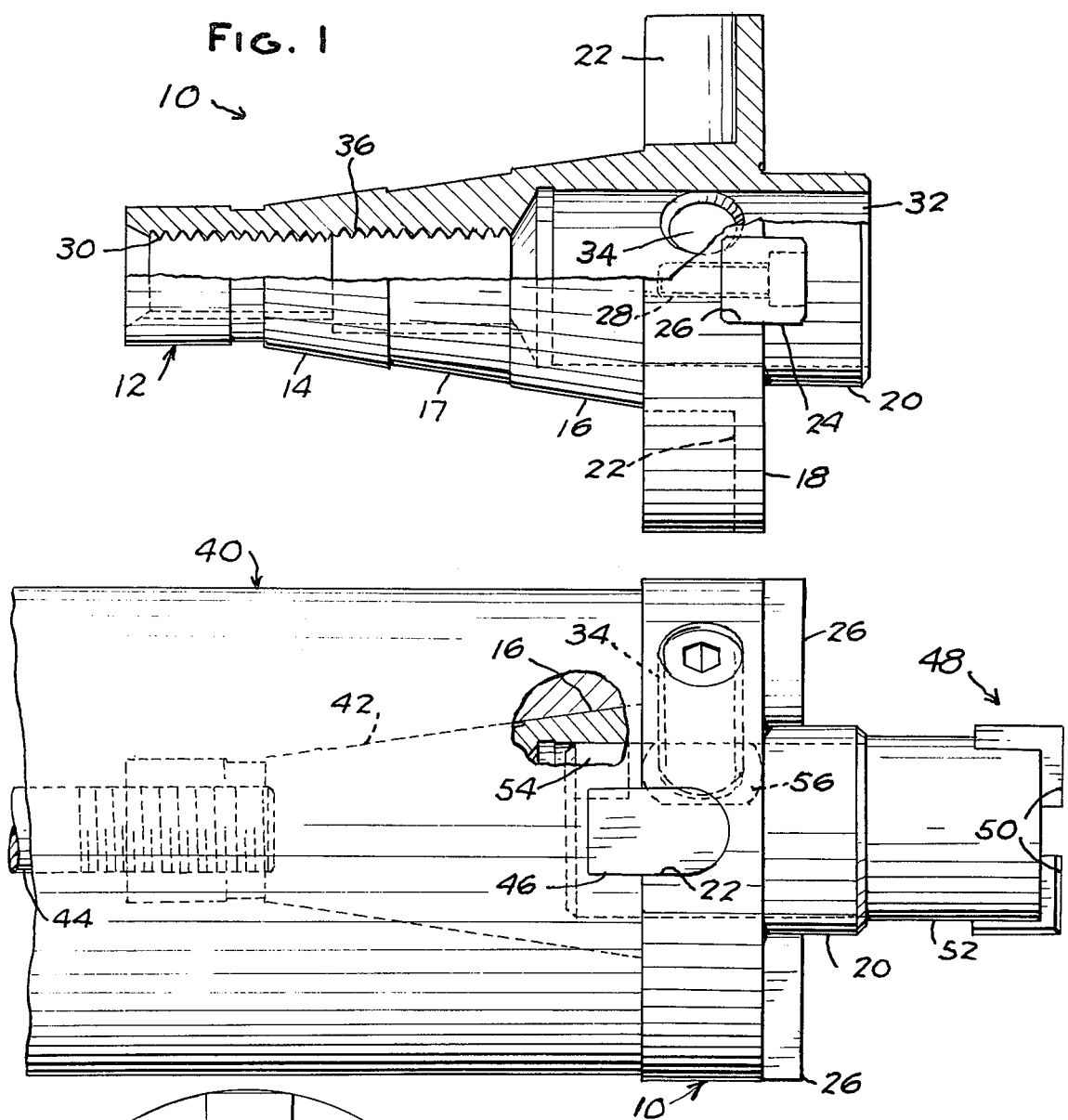
FIG. 1
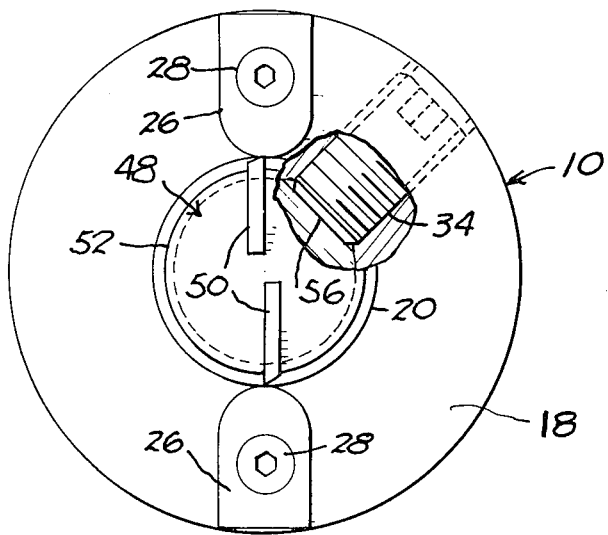
FIG. 2
FIG. 3

MILLING MACHINE CUTTER ADAPTOR

The invention relates to adaptors for mounting cutters on machine tools and more particularly to an adaptor for mounting either an end or a face mill cutter on the drive spindle of a machine tool, such as a milling machine.

With conventional milling machines it is necessary to stock various types of adaptors for mounting various types of milling cutters on the spindle of the machine. An adaptor for an end mill is usually formed with a cylindrical socket for receiving the cylindrical shank of a conventional end mill. An adaptor for a face mill is normally formed with a large flat mounting face against which the face mill is positioned and a threaded socket into which a clamp bolt is threaded for locking the face mill on the adaptor. The need for such special adaptors results in a large capital cost and also results in time consuming operations in changing adaptors when a change in the type of milling cutter is required.

Objects of this invention are to provide an adaptor facilitating rapid and easy mounting of either an end mill cutter or a face mill cutter on a spindle of a milling machine, which may be used with either conventional end mill or face mill cutters in conventional machine tool spindles, and is of economical manufacture.

These and other objects, features and advantages of this invention will be apparent from the following description, appended claims and accompanying drawings, in which: FIG. 1 is a side view partially in section of a milling machine cutter adaptor embodying this invention;

FIG. 2 is a fragmentary side view of a drive spindle of a milling machine with an end mill cutter received in the adaptor of FIG. 1 mounted in the drive spindle;

FIG. 3 is an end view, with a section broken away, of the spindle, adaptor and cutter assembly of FIG. 2;

Figure 4:
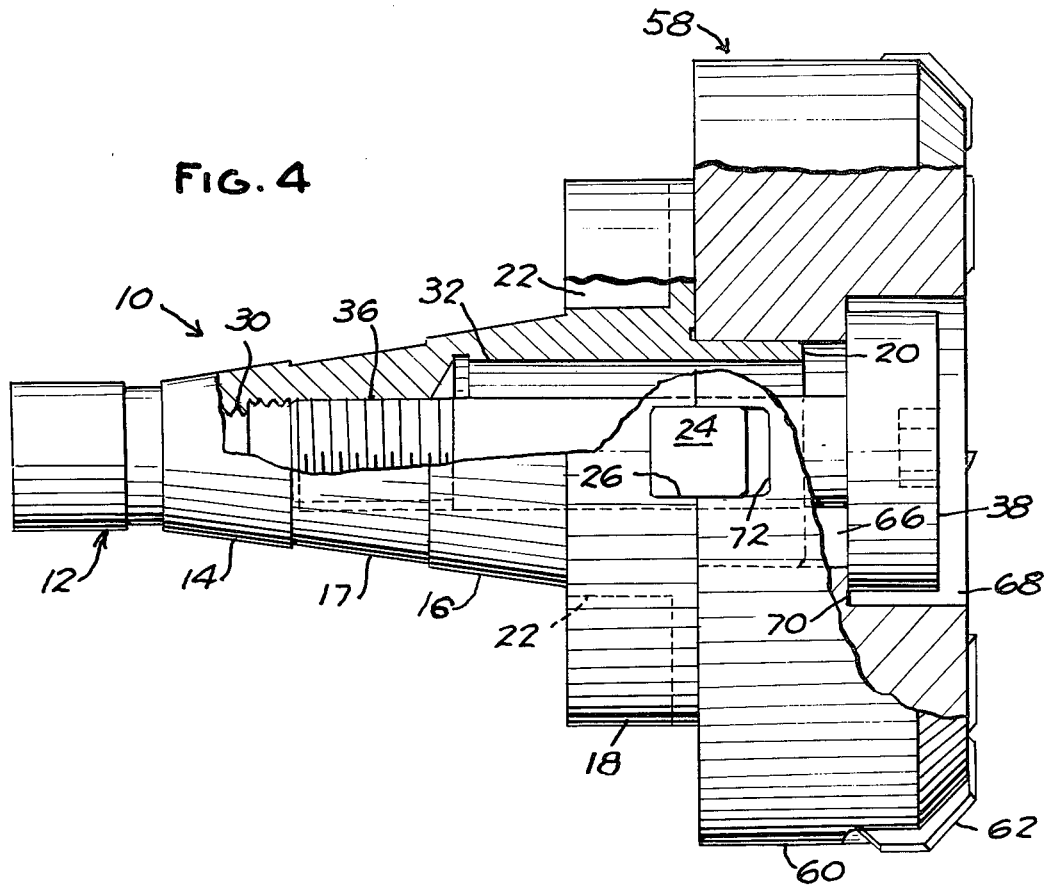
FIG. 4 is a side view partially in section of the adaptor of FIG. 1 with a face mill cutter mounted thereon.

Referring in more detail to the drawings, FIG. 1 illustrates an adaptor 10 embodying this invention with a body 12 preferably of heat treated steel having tapered exterior surfaces 14 and 16 thereon with a standard machine taper for mounting the body in a milling machine spindle and a relief area 17 therebetween. Adaptor 10 has a radially extending circumferentially continuous flange 18 adjacent its larger end with an integral pilot sleeve 20 projecting generally axially outwardly thereof for locating a face mill cutter on the adaptor. Flange 18 has a pair of opposed slots 22 opening into the rear face thereof for receiving driving keys on the machine spindle for rotating the adaptor and a pair of opposed driving keys 24 received in slots 26 in the front face of the flange and secured thereto by cap screws 28 for driving a face mill cutter. Adaptor 10 has a threaded axial bore 30 in the small end thereof for attachment of a spindle drawbar thereto and a counterbore 32 opening into the large end thereof through sleeve 20 to provide a pocket for receiving the shank of an end mill cutter. The end mill cutter is releasably retained in counterbore 32 by a lock screw 34 threadably received in flange 18 and extending generally radially into the counterbore. A threaded bore 36 between bores 30 and 32 is provided to receive the shank of a bolt 38 (FIG. 4) for retaining a face mill cutter on adaptor 10.

As shown in FIG. 2, adaptor 10 is mounted on a drive spindle 40 of a milling machine (not shown) with the tapered portion of body 12 received in a tapered socket 42 in the spindle. Tapered surfaces 14 and 16 of adaptor 10 are urged into mating engagement with the tapered sidewall of socket 42 by a spindle drawbar 44 engaging threaded bore 30 in the small end of adaptor 10. Driving keys 46 fixed to spindle 40 engage in slots 22 of the adaptor to rotate the adaptor with the spindle. As shown in FIGS. 2 and 3, an end mill cutter 48 with carbide cutting blades 50 in one end of a body 52 thereof has a reduced diameter shank 54 slideably received in counterbore 32 of the adaptor. Shank 54 of end mill cutter 48 has a flat 56 therein on which set screw 34 bears to releasably retain end mill cutter 48 in adaptor 10. The axial extent of counterbore 32 is sufficient to accommodate the full length of reduced shank 54.

Figure 5:
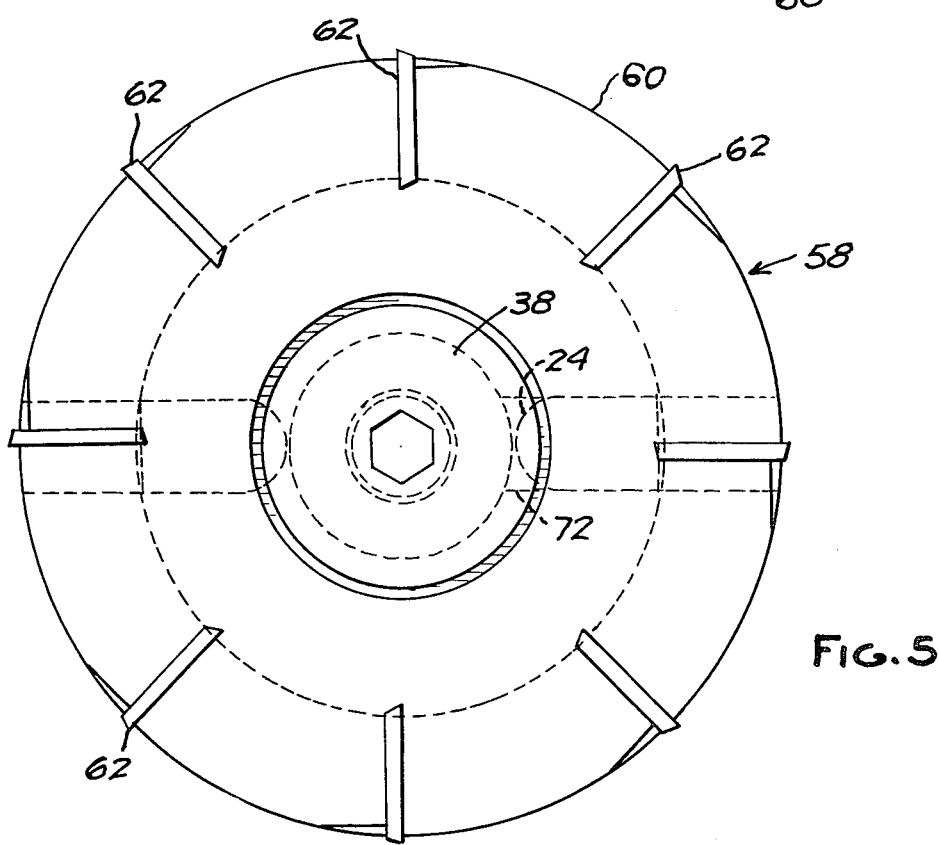
FIG. 5 is an end view of the adaptor and cutter assembly of FIG. 4.

As shown in FIGS. 4 and 5, a face mill cutter 58 having an annular body 60 with a plurality of carbide cutting blades 62 therein is releasably mounted on adaptor 10 by retainer bolt 38 engaging mating threaded bore 36 of the adaptor. Annular body 60 of face mill cutter 58 has an axial bore 66 therethrough which slideably engages pilot sleeve 20 and a counterbore 68 therein providing a recess with a shoulder 70 to receive the head of bolt 38 which urges face mill cutter 58 into firm engagement with flange 18. The rear face of face mill cutter 58 is formed with a pair of diametrically opposed grooves 72 which engage with keys 24 on the front face of flange 18 to establish a positive driving relationship between the adaptor and the face mill cutter.

In use adaptor 10 is inserted in socket 42 of spindle 40 of a machine tool and firmly retained therein in driving engagement with keys 46 received in slots 22 of the adaptor by drawbar 44 which engages the mating threads of bore 30 of the adaptor. Either end mill cutter 48 or face mill cutter 58 is mounted on adaptor 10 one at a time without removal of the adaptor. End mill cutter 48 is mounted in adaptor 10 by inserting shank 54 thereof into counterbore 32 of the adaptor and advancing lock screw 34 radially inward to bear on flat 56 in the shank and thereby releasably retain the end mill cutter in the adaptor for rotation therewith. Cutter 48 is removed from adaptor 10 by retracting lock screw 34 and withdrawing shank 54 of cutter 48 from counterbore 32.

Face mill cutter 58 is releasably mounted on adaptor 10 for rotation therewith by sliding central bore 66 of annular body 60 over pilot sleeve 20 of the adaptor and engaging grooves 72 with keys 24. Bolt 38 is inserted through annular body 60 and engaged with the mating threads of bore 36 in adaptor 10 to urge face mill cutter 58 into abutting engagement with the outboard face of flange 18 thereby releasably retaining the cutter on the adaptor for rotation therewith. Face mill cutter 58 is released for removal from adaptor 10 by removing bolt 38 from the adaptor.

A device embodying this invention provides a single adaptor for mounting both end and face milling cutters one at a time on the drive spindle of a milling machine without removing the adaptor from the drive spindle, thereby facilitating rapid and easy installation and removal of the milling cutters. By shaping the adaptor body to be received in a conventional spindle and to releasably retain standard end and face mill cutters, (as shown in the drawings herein) adaptors embodying this invention may be used with conventional milling machines and conventional end and face mill cutters. The adaptor embodying this invention has a one-piece body with a minimum number of component parts assembled thereon and, hence, is of economical manufacture and assembly and of rugged and durable design and construction.

I claim:

1. In combination a machine tool spindle adaptor for mounting a plurality of different milling cutters on the spindle, said adaptor comprising an annular body having a rear portion adapted to be telescopically engaged in the forward end of the machine tool spindle, said body having a central bore extending therethrough, the forward end portion of said bore comprising a smooth circular cylindrical surface and the rear end portion of said bore being threaded and of smaller diameter than the forward end portion of the bore, said body having intermediate its ends an enlarged radially outwardly extending circular flange, said flange having a flat front face portion with a pair of radially extending abutment means thereon, said body having an integral circumferentially continuous circular pilot boss extending forwardly from said front face concentric with said bore, the outer diameter of said boss being smaller than the outer diameter of said circular flange, a milling cutter having a central bore telescopically engaged over said pilot boss with a close fit, said cutter having a flat rear face portion positioned against the front face of said flange and having means thereon engaging said abutment means on said flange to establish a rotating driving connection between said adaptor and said cutter, the central bore in said cutter being enlarged adjacent the forward end of the cutter, the smaller diameter portion of the central bore in the cutter having an axial dimension greater than the axial dimension of said pilot boss and said enlarged bore defining a radially outwardly extending shoulder at the end thereof adjacent the smaller portion of the bore in the cutter, a screw extending axially through the bores in said cutter and adaptor, said screw having its rear end in threaded engagement with the threaded rear end portion of the central bore in said adaptor, the shank of said screw being of smaller diameter than the smooth cylindrical bore in said adaptor, said screw having an enlarged head at the forward end thereof seated against said shoulder to removably retain said cutter on said adaptor, said screw being adapted to be retracted out of said bore to enable removal of said cutter from said adaptor to thereby enable a second milling cutter having a circular cylindrical shank of a diameter corresponding to the central bore of the adaptor to be inserted in the bore of the adaptor, said flange having a radially extending threaded opening therein communicating at its inner end with said smooth diameter bore and a locking screw in said last-mentioned threaded opening adapted when advanced radially inwardly to engage the shank of a milling cutter in said smooth diameter bore for locking the last-mentioned cutter on the adaptor.

* * * * *